US005737463A

United States Patent [19]
Weiss et al.

[11] Patent Number: 5,737,463
[45] Date of Patent: Apr. 7, 1998

[54] MASSIVE PARALLEL OPTICAL INTERCONNECT SYSTEM

[76] Inventors: Roger E. Weiss, 10 Mary Way, Foxborough, Mass. 02035; Daniel P. Vladic, 42643 Linden La., Antioch, Ill. 60002; Philip W. Schofield, 1218 N. Euclid, Oak Park, Ill. 60303

[21] Appl. No.: 577,508

[22] Filed: Dec. 22, 1995

[51] Int. Cl.⁶ .................................................. G02B 6/38
[52] U.S. Cl. ........................... 385/59; 385/65; 385/83
[58] Field of Search ................................ 385/59, 60, 63, 385/65, 83, 54, 147

[56] References Cited

U.S. PATENT DOCUMENTS

| | | | |
|---|---|---|---|
| 4,146,301 | 3/1979 | Cherin et al. | 350/96.21 |
| 4,515,434 | 5/1985 | Margolin et al. | 350/96.21 |
| 4,725,120 | 2/1988 | Parzygnat | 350/96 |
| 4,753,515 | 6/1988 | Sato et al. | 350/96.21 |
| 4,818,058 | 4/1989 | Bonanni | 350/96 |
| 4,818,059 | 4/1989 | Kakii et al. | 350/96.21 |
| 4,830,456 | 5/1989 | Kakii et al. | 350/96.2 |
| 4,909,590 | 3/1990 | Kamiko et al. | 350/96.22 |
| 4,952,263 | 8/1990 | Kakii et al. | 156/153 |
| 4,973,127 | 11/1990 | Cannon, Jr. et al. | 350/96.22 |
| 4,983,012 | 1/1991 | Saito et al. | 350/96.21 |
| 4,998,796 | 3/1991 | Bonanni et al. | 350/96.21 |
| 5,054,879 | 10/1991 | Brown | 385/59 |
| 5,082,346 | 1/1992 | Myers | 385/54 |
| 5,155,784 | 10/1992 | Knott | 385/88 |
| 5,193,133 | 3/1993 | Schofield et al. | 385/85 |
| 5,233,674 | 8/1993 | Vladic | 385/56 |
| 5,257,332 | 10/1993 | Pimpinella | 385/59 |
| 5,309,538 | 5/1994 | Larson | 385/98 |
| 5,315,678 | 5/1994 | Maekawa et al. | 385/59 |
| 5,333,223 | 7/1994 | Schofield et al. | 385/84 |
| 5,339,376 | 8/1994 | Kakii et al. | 385/71 |
| 5,542,013 | 7/1996 | Kaplow et al. | 385/25 |
| 5,548,677 | 8/1996 | Kakii et al. | 385/92 |

FOREIGN PATENT DOCUMENTS

| | | | |
|---|---|---|---|
| 0 540 850 A2 | 5/1993 | European Pat. Off. | G02B 6/38 |
| 0 697 606 A2 | 2/1996 | European Pat. Off. | G02B 6/24 |
| 55-45051 | 3/1980 | Japan | G02B 7/26 |
| 57-58112 | 4/1982 | Japan | G02B 7/26 |
| 61-61111 | 3/1987 | Japan | G02B 6/40 |
| 1-230006 | 9/1989 | Japan | G02B 6/38 |
| WO 95/26515 | 10/1995 | WIPO | G01B 6/38 |

OTHER PUBLICATIONS

Us Conec Ltd. data sheet for Conec® Multifiber Ferrule, 1993 No month.
US Conec Ltd., brochure, "Application of Miniature Multifiber MTP Connector for Parallel Interconnects", Feb. 22–24, 1994 (6 pages).

*Primary Examiner*—John Ngo

[57] ABSTRACT

A massive parallel (MP) connector is provided which includes a fiber optic connector having a polymer ferrule having multiple fibers mounted in V-grooves of the ferrule and beveled edges of the ferrule providing for alignment of the ferrule when the MP fiber optic connector is mated to a receptacle having an alignment assembly and an alignment member mounted within the alignment assembly to provide for precision alignment.

59 Claims, 4 Drawing Sheets

MASSIVE PARALLEL OPTICAL INTERCONNECT SYSTEM

BACKGROUND OF THE INVENTION

This invention pertains to a fiber optic interconnect system and, in particular, a massive parallel optical interconnect system.

Optical fiber connectors having multiple fibers are known in the art. Such multi-fiber connectors are increasingly necessary as greater bandwidth applications are needed. Generally, the array of fibers are mounted in V-grooves which are etched in a silicon material in order to provide for precision positioning of the fibers. Precision positioning of the fibers in the silicon block is imperative so that when two connectors are mated, the fibers align as closely as possible in order to limit any signal loss. The use of silicon blocks is useful in that the V-grooves may be etched precisely. Etching of silicon blocks is well known in the art and generally is accomplished using standard anisotropic etchants, such as ethylene diamine pyrocatechol (EDP) or KOH in combination with a standard etch mask material such as thermally grown $SiO_2$. However, the mounting of silicon blocks within a housing and ensuring the proper alignment of two silicon blocks when they are mated is difficult where automated assembly is desired. Also, silicon is a hard, brittle material which is difficult to polish and is easily broken. Other multiple fiber connectors using silicon blocks have the blocks mounted within a housing and splines mounted next to the blocks which protrude beyond the end face of the block and the connector. This arrangement of assembling the connector having the silicon blocks, splines, fibers and a housing is time consuming. In other designs, splines are inserted within the silicon block. In such an arrangement, the connector having the splines protruding therefrom mates with a connector without splines; so that the first connector splines are inserted into the vacant grooves of the silicon block of the second connector. Such an arrangement is disadvantageous because the splines may stub on the silicon resulting in breakage. Moreover, silicon blocks as presently configured are not easily terminated in the field. Due to the arrangement of the connector housing, the fibers must be placed in the grooves of the silicon blocks prior to placing the major surfaces of the silicon blocks next to each other in order to capture the optical fibers within the grooves. Such assembly and alignment is not easily accomplished by technicians in the field.

Therefore, it is an object of the present invention to provide a massive parallel optical interconnect system which is easily and inexpensively manufactured and assembled and provides for simple field termination.

It is another object of the present invention to provide a fiber optic connector which has a common form factor presently used in the fiber optic connector industry.

It is a further object of the present invention to provide a multi-fiber connector in a miniaturized package.

It is also an object of the present invention to provide a ferrule which is easily and inexpensively manufactured and provides for precision alignment of massive or multiple optical fibers.

It is another object of the present invention to provide a miniaturized fiber optic connector having a multiplicity of optical fibers terminated therein.

It is also an object of the present invention to provide an interconnection system which allows both ends of the cable to be identically terminated to ease installation.

It is a further object of the present invention to provide methods of assembling a fiber optic connector which provides for a simple termination process.

SUMMARY OF THE INVENTION

A principal object of this invention is to provide a massive parallel interconnect system comprising a plug body including an aperture therethrough including a ferrule having beveled edges and a receptacle including an opening having an alignment sleeve having two alignment members for providing alignment with the beveled edges of the ferrule. The ferrule accommodates multiple fibers. The ferrule is injection molded plastic having grooves therein for receiving optical fibers. The grooves are rectilinear to the beveled edges of the ferrule. The plug body includes a mating end that dimensionally conforms to an SC style fiber optic connector form factor having an end face dimension of approximately 8.99 mm×7.39 mm. The ferrule includes at least two optical fibers. A pair of plug bodies is inserted into either end of the receptacle and provides for a precision alignment of the ferrules. The alignment sleeve includes a pair of alignment members mounted within the receptacle providing a spring-form system wherein a force is applied to the alignment members and towards the beveled edges of a ferrule parallel to major surfaces of the ferrule halves. The alignment sleeve includes a spring clip for retaining alignment members within the alignment sleeve. The spring clip includes arms having a hook portion for engaging the alignment member. The spring clip applies a spring force to the alignment members toward the beveled edges of the ferrule parallel to major surfaces of the ferrule halves. The plug body includes a rear holder mounted at the cable entry end of the plug body and the rear holder includes an aperture for receiving a fiber optic cable. The rear holder includes a strain relief which receives a bend relief boot. The fiber optic cable is secured to the rear holder via retention means to capture strength members of the fiber optic cable and transfer forces applied to the cable to the plug body. The plug body includes a marking to designate the position of the first optical fiber. The plug body includes a resilient member to provide for axial resiliency of the ferrule. The aperture of the plug body includes a diameter greater than the diameter of the ferrule wherein the ferrule is pivotally movable within the plug body. The plug body includes a sliding tab release sleeve. The receptacle includes latch arms. The receptacle includes an opening which dimensionally conforms to an SC style fiber optic receptacle form factor including an opening of approximately 9.0 mm×7.4 mm. The ferrule includes a window for receiving adhesive therethrough. The ferrule is terminated by inserting multiple optical fibers within grooves of the ferrule and securing the optical fibers within the grooves via chemical bonding and polishing the end face of the ferrule. The ferrule is formed of two halves each having a major surface having V-grooves therein and the halves each having a pair of beveled edges. The ferrule halves include a mating end and a rear end having a collar half molded integrally with the ferrule half. The ferrule includes a mating end and a rear end having a collar mounted thereon. The ferrules halves are bonded together and the fibers are secured therein via adhesive.

In an embodiment, a massive parallel optical connector is provided comprising a plug body having an aperture therethrough and a molded plastic ferrule having multiple optical fibers and the ferrule mounted in the aperture. The ferrule includes beveled edges. The ferrule is a molded plastic ferrule having grooves therein for receiving the optical fibers. The grooves are rectilinear to the beveled edges of the ferrule. The plug body includes a mating end which dimensionally conforms to an SC style fiber optic connector form factor having an end face dimension of approximately 8.9 mm×7.39 mm. The ferrule includes at least two optical fibers. The plug body includes a rear holder mounted at the cable entry end of the plug body and the rear holder includes an aperture for receiving a fiber optic cable. The rear holder includes a strain relief which receives a bend relief boot. The fiber optic cable is secured to the rear holder via a retention means such as a crimp sleeve, to capture strength members of the fiber optic cable and transfer forces applied to the cable to the plug body. The plug body includes a marking to designate the position of the first optical fiber. The plug body includes a resilient member to provide for the axial resiliency of the ferrule. The aperture of the plug body includes a diameter greater than the diameter of the ferrule so that the ferrule is pivotally movable within the plug body. The plug body includes a sliding tab release sleeve. The ferrule includes a window for receiving adhesive therethrough. The ferrule is terminated by inserting multiple optical fibers within grooves of the ferrule and securing the optical fibers within the grooves via chemical bonding and polishing the end face of the ferrule. The ferrule is formed of two halves each having a major surface having V-grooves therein and the halves each having a pair of beveled edges. The ferrule halves including a mating end and a rear end having a collar half molded integrally with the ferrule half. The ferrule includes a mating end and a rear end having a collar mounted thereon. The ferrule halves are bonded together and the fibers are secured therein via adhesive.

In an embodiment, a massive parallel connector is provided comprising a plug body including a mating end which dimensionally conforms to an SC style fiber optic connector form factor having an end face dimension of 8.9 mm×7.39 mm and an aperture through the plug body and a ferrule having multiple fibers and ferrule mounted within the aperture. The ferrule includes beveled edges. The ferrule is a molded plastic ferrule having grooves therein for receiving the optical fibers. The grooves are rectilinear to the beveled edges of the ferrule. The ferrule is formed of two halves each having a major surface having V-grooves therein and the halves each having a pair of beveled edges.

In an embodiment, a massive parallel optical connector is provided comprising a first block of polymer material having a groove formed in a first major surface for receiving an optical fiber, a second block having a second major surface abutting against the first major surface of the first block and a housing having an end face and an aperture for receiving the first and second blocks wherein a portion of the first and second blocks extend beyond the end face of the housing. The second block is formed of a polymer material. The second block includes a groove formed in the second major surface. The first and second blocks form a ferrule having multiple fibers. The first block includes beveled edges being rectilinear to the grooves. The housing end face dimensionally conforms to an SC style fiber optic fiber optic connector form factor having an end face diameter of approximately 8.99 mm×7.39 mm. The housing includes a rear holder mounted at a cable entry end of the housing and the rear holder including an aperture for receiving a fiber optic cable. The first and second blocks include a mating end and an opposed rear end having a collar half mounted integrally with the blocks. The first and second blocks include a mating end and a rear end having a collar mounted thereon.

In an embodiment, a massive parallel optical receptacle is provided comprising a receptacle housing including an opening having an alignment assembly having an alignment member for providing alignment with a connector received therein. The alignment assembly includes a pair of alignment members mounted within the receptacle providing a spring-form system wherein a force is applied to the alignment members. The alignment assembly includes a means for retaining alignment members within the alignment assembly. The retention means includes arms having a hook portion for engaging the alignment member. The spring clip applies a spring force to the alignment members toward beveled edges of a ferrule parallel to major surfaces of the ferrule halves. The receptacle includes latch arms. The receptacle includes an opening which dimensionally conforms to an SC style fiber optic receptacle form factor including an opening of approximately 9.0 mm×7.4 mm.

In an embodiment, a method of forming an optical connector is provided including the steps of forming a silicon block master template, forming a mold insert from the master template, injection molding plastic block halves from the mold insert and assembling a ferrule from the plastic block halves. The method further including the steps of injection molding plastic block halves from the mold insert having grooves, inserting fibers in the grooves and securing the fibers in the grooves. The method further including the steps of inserting a core pin in the grooves of a first half, securing a second half to a first half, removing the core pins, inserting fibers in the grooves and securing the fibers in the grooves. The method wherein the fibers are secured via an adhesive. The method wherein the silicon block master template is formed by anisotropically etching grooves and beveled edges simultaneously along crystallographic planes, wherein the center axes of the grooves are in line with the center axes of the beveled edges. The method wherein the mold insert is formed by nickel plating the silicon block master template. The method wherein the plastic block is injection molded of a dimensionally stable polymer material.

These and other features of the invention are set forth below in the following detailed description of the presently preferred embodiments.

DETAILED DESCRIPTION OF THE PRESENTLY PREFERRED EMBODIMENTS

Figure 1:
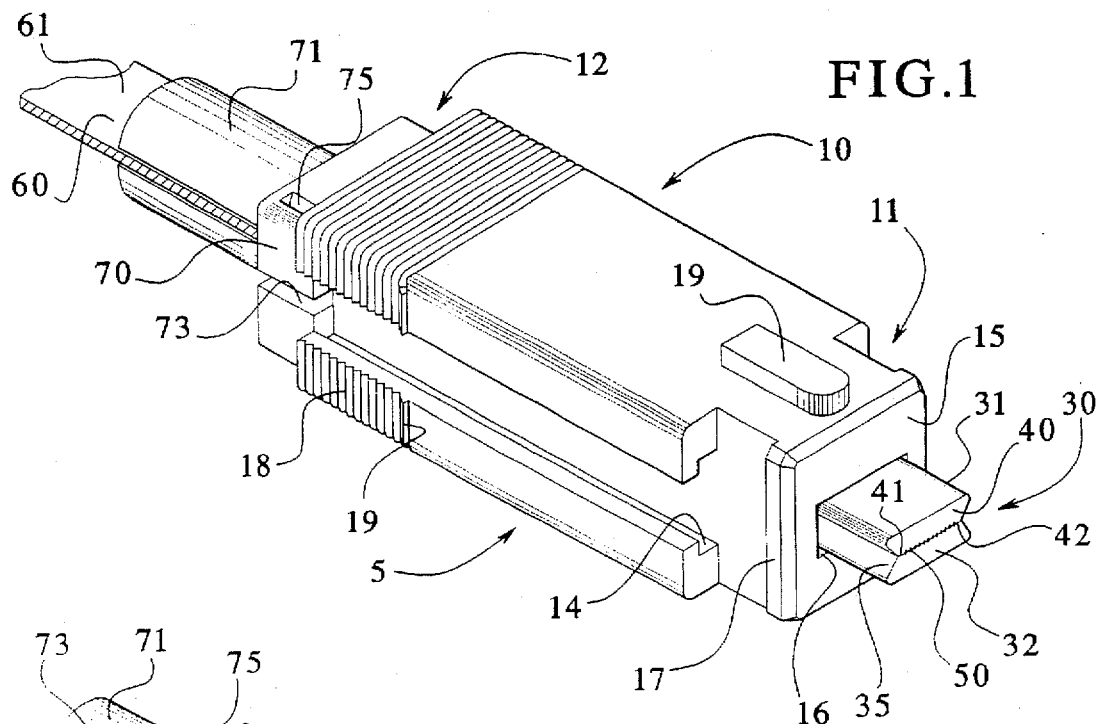
FIG. 1 is a perspective view of the fiber optic connector of the present invention.
Figure 2:
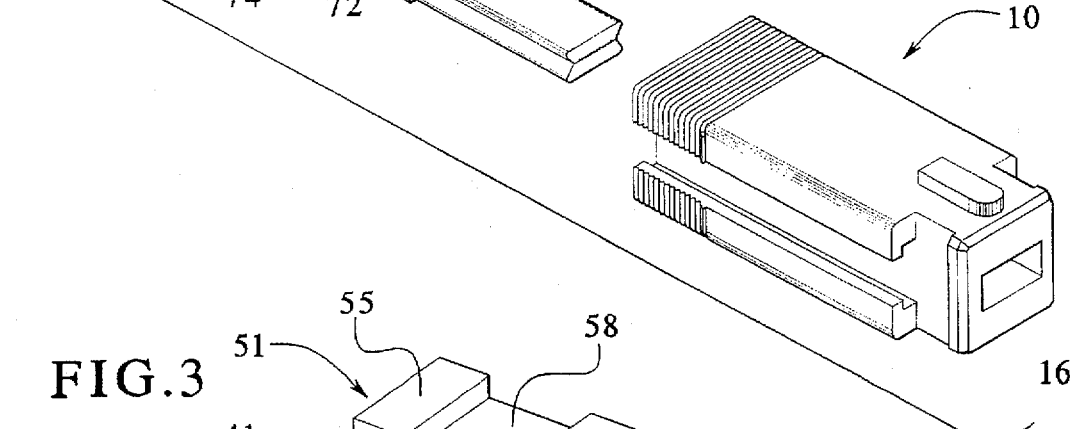
FIG. 2 is an exploded view of FIG. 1.
Figure 3:
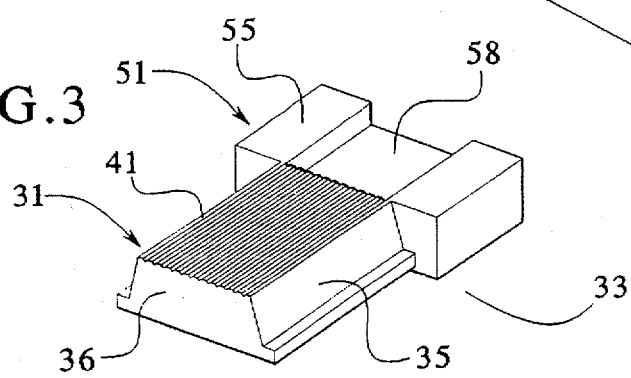
FIG. 3 is a perspective view of a block half of the present invention.
Figure 7:
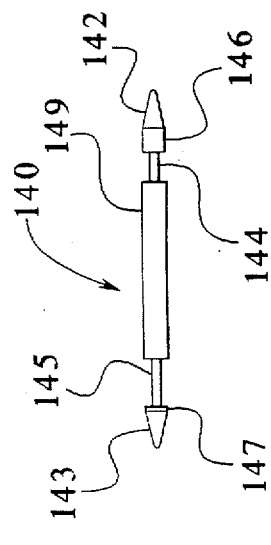
FIG. 7 is an alignment member of the present invention.

The present invention relates to a massive parallel (MP) optical interconnect system. A preferred embodiment of the present invention is best understood with reference to FIGS. 1–10. FIGS. 1, 2 and 3 disclose the MP optical connector of the present invention; FIGS. 6, 7 and 10 disclose the MP optical receptacle of the present invention; and FIGS. 4, 5, 8 and 9 disclose both the MP optical connector and MP optical receptacle interconnect system of the present invention.

FIG. 1 discloses a preferred embodiment of an assembled MP optical connector 5 having plug body 10. The plug body 10 includes a mating end 11 and a cable entry end 12. The mating end 11 includes a connector end face 15. In a preferred embodiment, the dimensions of the mating end 11 of the plug body 10 dimensionally conform to the form factor for an SC style fiber optic connector as covered under Japanese Industrial Standard C 5973. Therefore, the end face 15 has dimensions of approximately 7.39 mm×8.99 mm. While this is a preferred embodiment, the end face dimensions of alternate embodiments of the present invention may be of any size. Running through the plug body 10 is an aperture 16 (see FIG. 2). The aperture 16 communicates between the end face 15 and the cable entry end 12 of the plug body 10. Extending beyond the end face 15 is a ferrule 30. The MP optical connector 5 of FIG. 1 is shown in its fully assembled form, including the ferrule 30 having optical fibers 50 terminated therein. The ferrule includes a first half 31 and a second half 32 being molded of a polymer material. The first ferrule half 31 and second ferrule half 32 abut each other at first major surface 41 of the first half 31 and second major surface 42 of the second half 32. In a preferred embodiment, each ferrule half 31,32 includes V-grooves along its major surface 41,42. Mounted within the V-grooves are optical fibers 50. In a preferred embodiment, twelve optical fibers are shown mounted in the ferrule 30. Alternate embodiments may have 2, 4, 6, 8 or 10 or more fibers according to standard multi-fiber cable arrangements. Each ferrule half 31,32 includes beveled edges 35 oriented so that the major surface 41,42 has a width less than the width of the side of the ferrule half opposite the major surface.

In a preferred method of forming the present invention as shown in FIG. 3, the V-grooves and the beveled edges 35 of the plastic ferrule halves 31,32 are formed from a silicon block master template which is used of form a mold insert in which the ferrule halves 31,32 are injection molded. The halves are molded of a dimensionally stable polymer material such as a liquid crystal polymer (LCP) according to the following process. A master template is formed of silicon by anisotropically etching the desired number of V-grooves along the crystallographic planes of the silicon block and on the desired spacing. The beveled edges are formed simultaneously in the silicon by etching a deep groove. A cut is made in the bottom of the groove in order to form the sides of the silicon block. Since the beveled edges are etched at the same time along the same crystallographic planes as the fiber grooves, the center axes of the fibers mounted in the grooves will be in line with the center axes of the alignment members to be mounted in the beveled edges of the plastic ferrule formed from the silicon template. The V-grooves of the silicon block are formed by masking part of the silicon block and anisotropically etching the grooves in the desired locations. Masking inhibits the etching of material from areas of the block where grooves are not desired.

The master template silicon block is then nickel plated in order to make a mold insert having the negative proportions of the silicon block. The silicon block is then removed from the resultant mold insert and the mold insert is then used in conjunction with other mold inserts and incorporated into injection mold tooling to injection mold a plastic block half 33 including ferrule half 31 and a ferrule rear body half 51. As the first half 31 and second half 32 of the ferrule 30 are hermaphroditic, a single mold may be used to injection mold both halves. Thus, the block half 33 is molded in a preferred embodiment having ferrule half 31 including grooves 36 along major surface 41 and beveled edges 35 and ferrule rear body 51 including cellar 55, recess 58 and window 57. The above process provides for the etching of all the grooves of the silicon block completely and simultaneously without masking or cutting the outside beveled edges. According to the above description, it may be understood that a multi-fiber ferrule having precision aligned grooves and edges may be manufactured quickly, easily and inexpensively.

A further preferred method of assembling and terminating the ferrule is as follows. Assembly of the ferrule 30 after it is injection molded is accomplished by placing core pins (not shown) in the grooves 36 of the first half 31 (see FIG. 3). The major surfaces 41,42 are then placed together to enclose the core pins between the two halves 31,32. The core pins extend beyond the end of the ferrule halves so they may be easily removed. The two halves are then secured together, for example, by chemical bonding or sonic welding. A collar 55 (see FIG. 2) which is injection molded simultaneously with the ferrule half 31 includes a recess 58 from which the core pins may protrude. In an alternate embodiment, a separate collar is secured around the rear body of the ferrule halves 31,32. The core pins have a diameter just slightly larger than the diameter of the optical fibers to be replaced in the grooves. For example, the core pins may have a diameter of approximately 0.1255 microns. The core pins are removed, leaving the ferrule 30 having V-groove passages which are precisely aligned between the top half 31 and bottom half 32 and are free from any disturbance along their passage walls such as misalignment of the V-grooves of the ferrule halves 31,32. The ferrule being assembled in this manner may then be quickly and easily terminated according to the description below.

Turning to FIG. 2, the assembled ferrule 30 is shown prior to termination. While FIG. 1 shows the optical connector of the present invention in the fully assembled orientation, FIG. 2 shows an exploded view of the fiber optic connector in an unassembled state and prior to the termination of the ferrule 30 and attachment of cable 60 and optical fibers 50. The unique arrangement of the present invention allows for the entire connector to be assembled in a factory so that it arrives to the field in the fully terminated state as shown in FIG. 1 or the connector may be delivered to the field in a disassembled state such as shown in FIG. 2, to be assembled by a field technician.

Termination of the ferrule 30, according to a preferred method includes the steps of stripping a multi-fiber cable 6 so that the bare fibers protrude a predetermined distance beyond the insulation of the cable 60 and exposing the strength members. The stripped cable is then inserted through the rear holder assembly 70. The fibers are first inserted through the strain relief portion 71 and exit from a bore 72 of a spring support 74. The cable 60 and bare fibers 50 are pulled through the bore 72 so that there is an excess length of the cable 60 and fibers 50 to work with. The rear holder assembly 70 may include a slot along its length allowing it to be placed on the cable after assembly. The parallel array of fibers 50 are then inserted through the collar 55 so that the cable is received by recess 58 (see FIG. 3) and the fibers 50 are received by the multiple grooves 36 of the ferrule 30. The recess 58 of the ferrule rear body may act as a strain relief or bend relief member for the cable 60. The multiple fibers are pushed through the ferrule 30 so that the ends of the fibers protrude beyond the ferrule end face 40. The fibers are then secured within the ferrule 30 via chemical bonding such as injection of an anaerobic adhesive within the ferrule. For example, a primer such as Locquic® Primer N 7649 (Loctite Corp., Rocky Hill, Conn.) is used with a hardener such as RC™ 680 Retaining Compound High Strength (Loctite Corp., Rocky Hill, Conn.). Anaerobic adhesives are preferred because they cure upon exposure to air and adhere well to plastics. Alternate chemical bonding methods may also be used such as epoxies used with curing ovens. The adhesive may be injected from either end of the ferrule 30 or through window 57. The adhesive secures the fibers within the V-grooves of the ferrule 30 and also secures the ferrule halves 31,32 together.

After the adhesive has cured the optical fibers 50 are then cleaved and polished. In an alternate embodiment of the present invention, the ferrule end face 40 may also have molded around the V-grooves a polishing pedestal such as that disclosed in U.S. Pat. Nos. 5,333,223, and 5,193,133 which are incorporated herein by reference. The end face of the ferrule 40 is polished using standard polishing procedures so that the optical fibers 50 are in an optimal condition for transmission. The aforementioned termination procedure may be easily accomplished in the field by technicians. This termination process is similar to termination methods for single fiber ferrules such as SC connectors and is repeatable with a high rate of success. Due to the novel construction of the multi-fiber ferrule of the present invention, and the preassembly of the ferrule halves 31,32 into a single ferrule unit 30, the termination process is accomplished quickly and easily. After polishing, the rear holder 70 is installed onto cable 60, for example, by pulling the cable 60 back through the rear holder 70 or inserting the cable through a slot 73 in the side of the rear holder 70. The slot 73 is dimensioned so that the cable may be inserted into the rear holder 70, but not able to escape therefrom. The cable 60 is anchored to the rear holder 70 by capturing the Kevlar® strength members of the cable 60 around the rear holder 70 using a retention means such as a crimp sleeve (not shown). The rear holder 70 and ferrule 30 are then inserted within the aperture 16 of the plug body 10 so that the terminated ferrule 30 protrudes beyond the end face 15 of the plug body 10 in its fully assembled position as shown in FIG. 1. A bend relief boot may be slid over strain relief portion 71.

In an alternate method of assembling the MP optical connector of the present invention, the fibers are placed in the grooves of a first ferrntic half 31, adhesive material is added and the second ferrule half 32 is then placed over the first half so that the major surfaces 41,42 abut and enclose the fibers 50 within the ferrule 30. The rear holder 70 is installed onto the cable and the ferrule is inserted into the plug body 10. Due to the unique assembly of the multiple fiber ferrule 30, the field assembly and termination of the optical fibers to the ferrule 30 and final assembly of the MP optical connector may be easily and quickly accomplished, providing for a high precision data transfer means.

Returning to FIG. 1, the plug body 10 also includes T-shaped slots 14 on opposite sides of the plug body. The T-shaped slots 14 accommodate a sliding tab release sleeve 81 (see FIG. 8) which is attached over the plug body 10 and provides for the easy disconnection of the plug 5 from a receptacle as described in U.S. Pat. No. 5,233,674, which is incorporated herein by reference. The plug body 10 also includes detentes 19 which protrude adjacent the T-shaped slots 14 and prohibit the sliding tab release sleeve 81 (see FIG. 8) from sliding off of the cable entry end 12 of the plug body 10. The sliding tab release sleeve 81 is mounted onto the plug body 10 by sliding over the cable entry end 12 of the plug body 10 and past the detente 19. The sliding tab release sleeve 81 includes tab release members 82 which ride in T-shaped slots 14 and upon sliding of the tab release sleeve 81 forward, the tab release members 82 will unlatch the plug body 10 from a receptacle (see FIGS. 4, 5 and 8). The plug body 10 also includes at the cable entry end 12 ribbed surface 18 to aid in gripping the plug body 10. The plug body also includes a polarizing member 19. The polarizing member 19 assures that the plug body 10 is inserted into a receptacle in the proper orientation. In addition, because there are multiple fibers 50 mounted within the ferrule 30, the proper orientation of the fibers must also be designated. It is common for multiple fiber cables to be marked to designate fiber "1" as shown by marking 61 on cable 60. The rear holder 70, as well as the collar 55 of the ferrule assembly 30, may also be correspondingly marked to indicate the position of fiber "1". This marking 75 is visible when the fiber optic connector is assembled, so that the first fiber position of the fiber optic connector may be inserted in a receptacle in such a way that when a second fiber optic connector is inserted on the other side, the first fibers will align and data can be transferred according to a preestablished sequence. Any other means of designating the position of fiber "1" may also be used.

Figure 4:
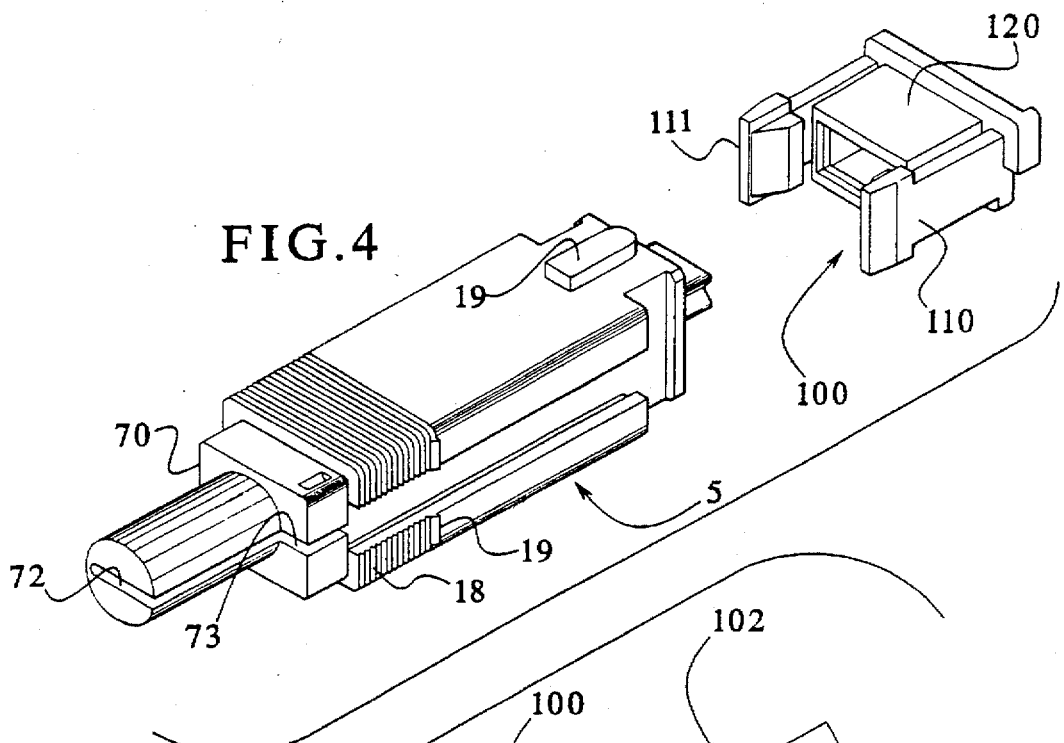
FIG. 4 is a perspective view of the fiber optic interconnect system of the present invention wherein the fiber optic connector of FIG. 1 is shown being inserted into a receptacle of the present invention.
Figure 5:
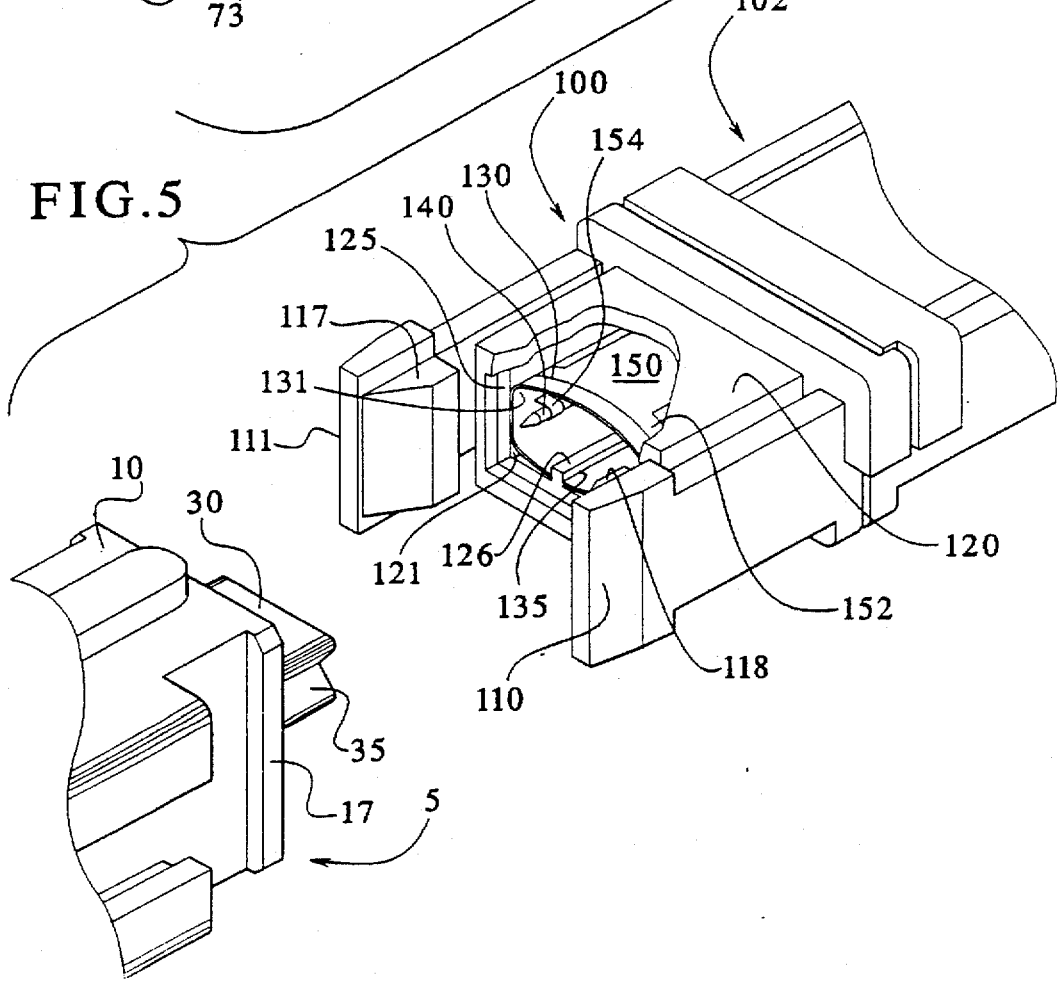
FIG. 5 is an enlarged view of FIG. 4 showing a cut-away view of the receptacle of the present invention.
Figure 6:
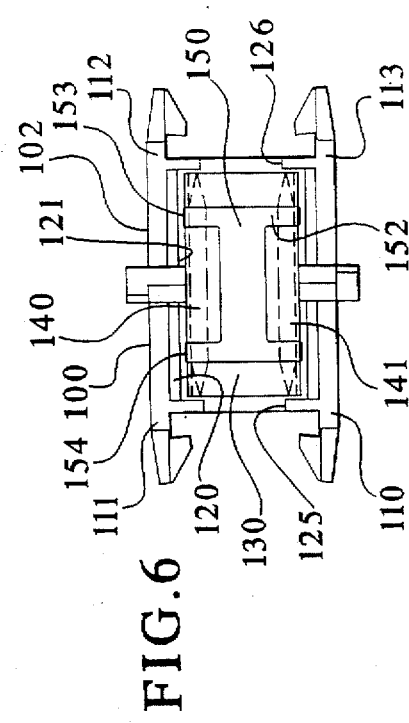
FIG. 6 is a cut-away top view of the receptacle of the present invention taken at line 6—6 and FIG. 9.

Turning to FIGS. 4 and 5, the optical interconnect system of the present invention is shown. MP optical connector 5 is shown in its unmated condition from MP optical receptacle 100. Referring to FIG. 4, the MP optical connector 5 is intermatable with the receptacle 100. The receptacle 100 includes latch members 110,111 and housing 120. As well, a receptacle outer housing 160,162 (see FIG. 8) encloses the receptacle 100 and includes a polarizing slot thereon for receiving polarizing member 19. The latch members 110,111 and the housing 120 of the receptacle 100 are formed to dimensionally conform to a fiber optic SC style receptacle form factor as covered in Japanese Industrial Standard C 5973, discussed previously. As the MP optical connector 5 of a preferred embodiment of the present invention has been formed so that it dimensionally conforms to an SC style connector form factor, it is intermatable with a receptacle having latches 110,111 a housing 120 and an outer housing 160,162 of standard SC style receptacle size having an interior chamber dimension of approximately 9.0 mm×7.4 mm. However, the multiple fiber ferrule of the present invention includes an improved alignment means within the interior of the housing 120 of the receptacle 100.

FIG. 5 is an enlarged view of FIG. 4 having the receptacle housing 120 broken away to expose the alignment means therein. Mounted within the rectangular chamber 121 of the housing 120 is an alignment sleeve assembly 130. In a preferred embodiment, the alignment sleeve 130 is formed of a metallic material. The alignment sleeve 130 is generally oval in shape, having its elongated edges bowed outward. The alignment sleeve includes sidewalls 131. The alignment sleeve 130 is split at joint 135 which abuts a boss 126, of the housing 120. The alignment sleeve 130 is shown in its most contracted state having joint 135 tightly gripping the boss 126. Upon insertion of the connector 5 and ferrule 30 within the alignment sleeve 130, the sleeve 130 will expand (see FIG. 9). The fully expanded alignment sleeve is positioned within the housing so that it may freely float therein. For example, approximately a 0.005 inch buffer area is provided between the interior wall of the receptacle chamber 121 and the fully expanded external surface of the sidewalls 131 of the alignment sleeve 130. Mounted adjacent the sidewalls 131 is an alignment member 140. In a preferred embodiment, the align- ment member 140 is mounted within the alignment sleeve 130 via a spring clip 150. The spring clip 150 includes arms 152 which attach the spring clip 150 to the alignment sleeve 130. The arm 152 includes a hook portion 154. The hook portion 154 protrudes through a window 190 (see FIGS. 9 and 10) in the sidewall 131 of the alignment sleeve 130. The alignment member 140 is inserted through the hook portion 154 and supported therein. In an alternate embodiment, the alignment sleeve 130 may have hook portions 154 attached directly to the alignment sleeve to receive the alignment member 140 therein.

Upon mating of the MP optical connector with the MP optical receptacle 100, the latches 110,111 latch with the plug body 10 and simultaneously, the ferrule 30 is inserted within the alignment sleeve 130. The alignment members 140 of the alignment sleeve 130 engage the beveled edges 35 of the ferrule 30. The alignment members 40 have tapered ends so that the beveled edges 35 of the ferrule 30 may abut against the tapered edges of the alignment members 140 and be guided to the major longitudinal surface (center body portion 149; see FIG. 7) of the alignment member 140. The alignment means of the present invention provides for a spring-form system so that only the alignment members 140,141 come into contact with the ferrules 30,30' (see FIGS. 8,9) at the beveled edges 35. In this way, the ferrules 30,30', upon insertion within the alignment sleeve 130 will find their own centers and the alignment members 140 under pressure from the spring clip 150 will apply approximately one to three pounds of force against the beveled edges 35 of the ferrule 30. The MP optical connector 5, once inserted within the receptacle 100, is in a condition to mate with a second MP optical connector 6 being inserted from the other side of the receptacle 100 (see FIG. 8). The receptacle 100 is attached to a second receptacle 102 which receives a second MP optical connector 6 in an opposing direction to that of MP optical connector 5. The second receptacle 102 includes a chamber which communicates with the chamber 121 of the housing 120 of the first MP optical receptacle 100. The alignment sleeve 130 is mounted within the pair of chambers 121 of the first and second receptacles 100,102. Thus, it can be understood that the alignment members 140 run from a first opening 125 of the chamber 121 in the first receptacle 100 to the second opening 126 (see FIG. 6) of the chamber 121 of the second receptacle 102. In this way, the second MP optical connector 6 which is inserted in the second receptacle 102 is guided along the alignment members 140 so that the end faces of the ferrules 30,30' of the mating MP optical connectors 5,6 are precisely aligned so that the multiple optical fibers mounted within the ferrules are in alignment and provide for optimal transmission. Hence, the alignment of the ferrules is totally under the influence of the two alignment members.

The latch arms 110,111 include locking projections 117, 118. The locking projections 117,118, include tapered front portions to engage with the shoulder 17 of the plug body 10. Upon full insertion, the locking projections 117,118 spring behind the shoulder 17 in order to lock the MP optical connector 5 to the MP optical receptacle 100. In order to release the connector 5 from the receptacle 100, any means may be incorporated. However, in a preferred embodiment, a sliding tab release sleeve 81 is used, as discussed above, in order to engage the locking projections 117,118 and spread them outwardly so that the MP optical connector 5 may be released from the receptacle 100.

Figure 9:
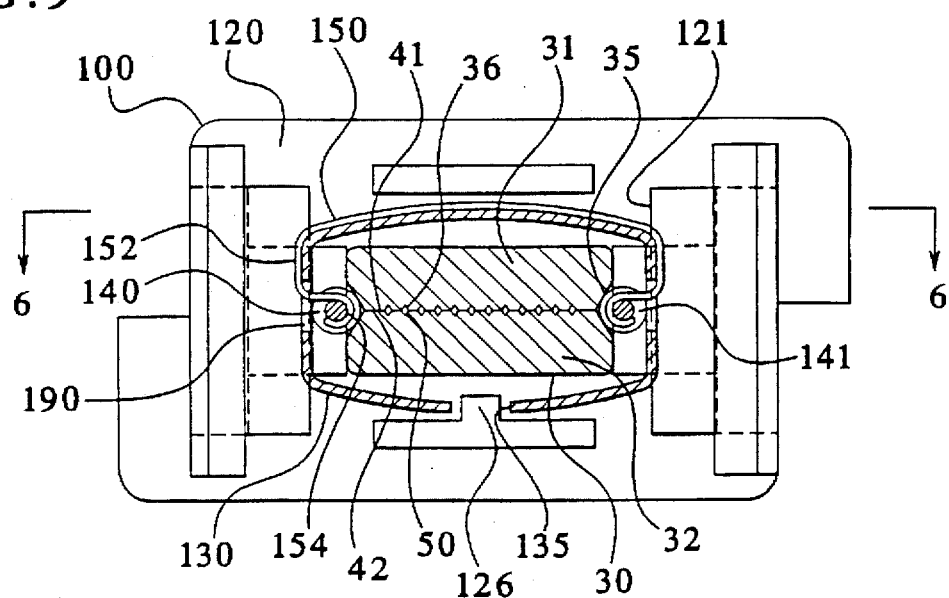
FIG. 9 is an end cut-away view of FIG. 8, taken at line 9—9.
Figure 10:
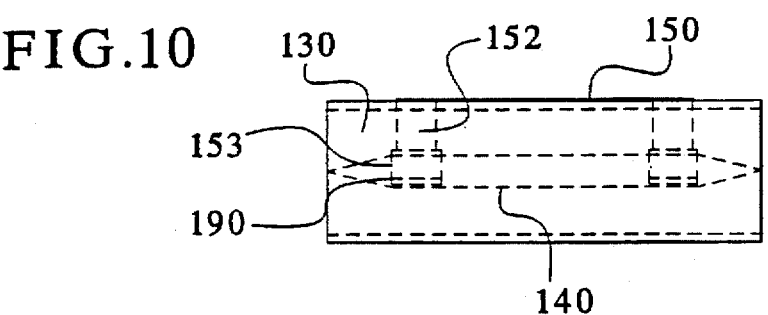
FIG. 10 is a side view of the alignment means of the present invention as shown in FIG. 6.

FIG. 6 discloses the MP optical receptacle assembly of the present invention and is a top cut-away view taken at line 6—6 of FIG. 9. Receptacle halves 100,102 are shown connected together to form a coupling, having a common chamber 121 communicating therebetween. The receptacles 100,102 include housing 120 and latch arms 110,111,112, 113. The housing 120 includes openings 125,126 at each end of the chamber 121. Mounted within the chamber is the alignment sleeve 130. Attached to the alignment sleeve 130 is spring clip 150 and alignment members 140,141 which run from the first opening 125 to the second opening 126.

Turning to FIG. 7, the alignment member 140 is shown having a first end 142 and a second end 143. It can be seen that the alignment member 140 includes a first reduced diameter portion 144 adjacent the first end 142 and a second reduced diameter portion 145 adjacent the second end 143. The first reduced diameter portion 144 is narrower than the second reduced diameter portion 145. In addition, the first end 142 includes a broader head portion 146 than head portion 147 of the second end 143. This arrangement provides for the easy assembly of the alignment means of the present invention. The alignment means as assembled by attaching the spring clip 150 to the alignment sleeve so that the hook portions 153,154 of the arms 152 protrude within windows 190 of the alignment sleeve 130 (see FIGS. 6, 9, and 10). The alignment members 140 are then slid within the alignment sleeve 130 with the first end 142 of the alignment member 140 being inserted at the first opening 125 through the hook portion 154 of the spring clip 150. The first end 142 includes a narrow first reduced diameter portion 144 which enables the alignment member 140 to slide from the first opening 125 past the hook portion 154 and the hook portion 154 runs along the center body portion 149 of the alignment member 140 toward the second opening 126. The first end 142 of the alignment member 140 then abuts the hook portion 153 at the second opening 126 until the hook portion 154 is seated within the second reduced diameter portion 145. Simultaneously, the hook portion 153 will seat within the first reduced diameter portion 144. In this orientation, the alignment member 140 will then not be able to be removed from the alignment sleeve 130. As well, the hook portions 153,154 form a recessed surface with the center body portion 149 of the member 140 assuring that only the precision surface of the member 140 contacts the beveled edges of the ferrule 30.

Figure 8:
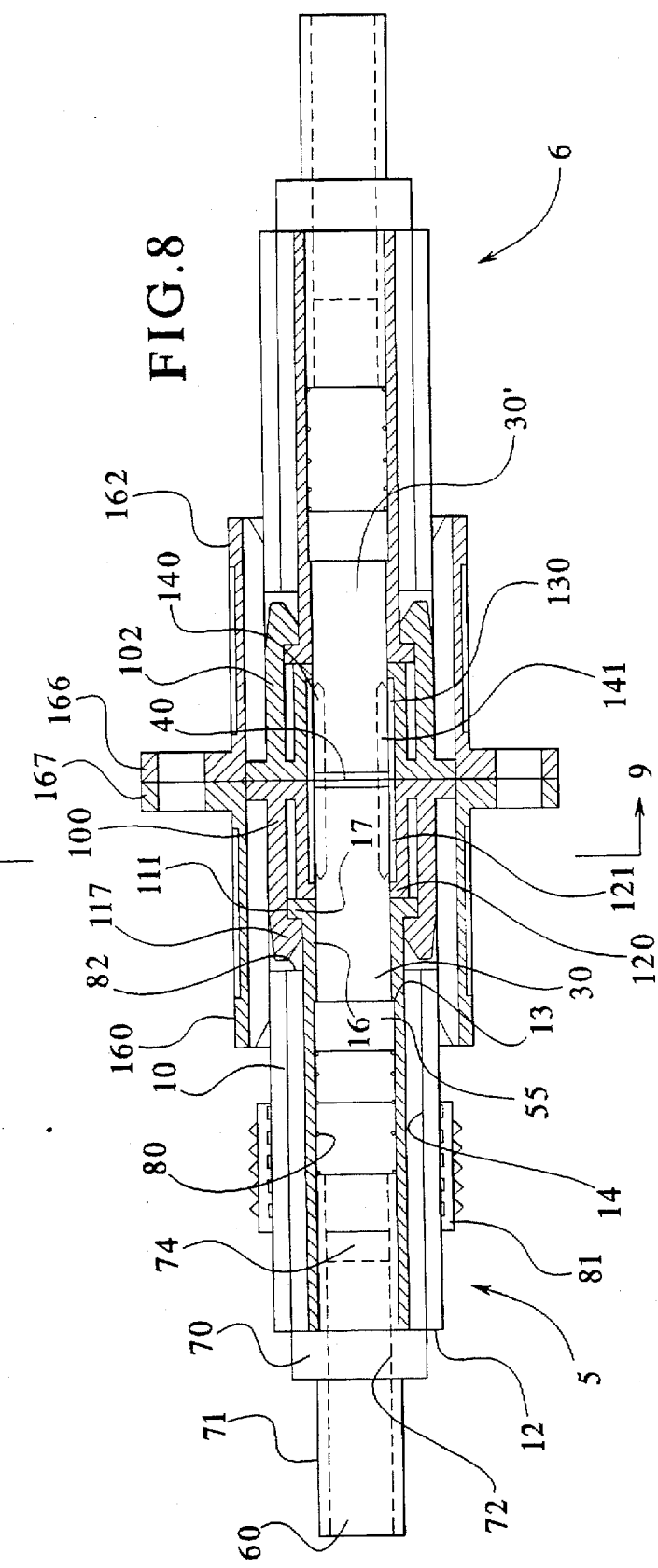
FIG. 8 is a top cut-away view of the optical interconnect system of the present invention having a pair of fiber optic connectors mated within a receptacle.

Turning to FIG. 8, a top cut-away view of the MP optical interconnect system of the present invention having a pair of MP optical connectors 5,6 mated within a coupler or MP optical receptacles 100,102 is shown. Receptacle outer housings 160,162 are shown attached together having receptacles 100,102 mounted therein. It is noted that in FIGS. 4–6, only the receptacle 100,102 is shown. However, in a preferred embodiment, an outer housing 160,162 is present having mounting flanges 166,167. The receptacles 100,102 include housing 120 and inner chamber 121. Mounted in the chamber 121, within each receptacle half 100,102, is an alignment means including an alignment assembly having a single alignment sleeve 130. Mounted within the alignment sleeve 130 are alignment members 140,141. The alignment assembly prevents the transmission of misaligning forces between the two interconnected ferrules. Inserted within the alignment means are a pair of MP optical connectors 5,6 from each side joining within the receptacles 100,102. A first connector 5 includes ferrule 30 which abuts with ferrule 30' of a second connector 6 at end face 40.

While only specific elements of the first connector 5 will be discussed, like elements are also found in the identical second connector 6. The ferrule 30 is mounted within the aperture 16 of the plug body 10. The ferrule 30 includes at its rear end, collar 55. The collar 55 as discussed previously may be a separate member placed onto the ferrule halves in order to maintain them together. The aperture 16 includes step 13. The collar 55 abuts the step 13 so that the ferrule 30 may not escape through the front end of the aperture 16. Mounted in the aperture 16 behind the collar 55 is a resilient member 80, such as a spring. In a preferred embodiment, the spring 80 has a rectangular shape to correspond to the rectangular aperture 16. The spring 80 provides for resiliency in the ferrule 30 so that upon mating with a ferrule 36 of a second connector 6, the ferrules 30,30' may have axial flexibility in order to cushion the abutment of the ferrule end faces and avoid degradation of the end face surfaces 40. In addition to the axial flexibility which the spring 80 provides, the aperture 16 also includes a larger diameter than the collar 55 so that a slight pivotal movement of the ferrule also is provided. This arrangement allows for the ferrule to be aligned most precisely within the alignment sleeve 130. The spring 80 abuts against spring support 74 which is attached to the rear holder 70 which is mounted at the cable entry end 12 of the plug body 10. Inserted through bore 72 of the rear holder 70, is a multiple fiber optical cable 60. The cable 60 exits from the strain relief portion 71. A bend relief boot (not shown) is attached to the strain relief portion 71 in order to limit the strain of the cable as it enters into the connector 5. The cable 60 is attached to the rear holder 70 by securement of the strength members of the cable 60 to the holder 70 so that the forces applied to the cable 60 are transferred to the rear holder 70 and to the plug body 10. The plug body 10 also includes a sliding tab sleeve 81 which includes tab release members 82 which slide forward in T-shaped slot 14 to abut against locking projections 117 of the latch arms 111. Upon insertion of the release member 82 adjacent the locking projection 117, the latch arm 111 will be pushed outwardly so that the locking projection unlocks from the shoulder 17 of the plug body 10. The MP optical connector 5 may then be removed from the MP optical receptacle 100.

Turning to FIG. 9, a cut-away view of the interconnect system of FIG. 8, taken at line 9—9 is shown. The receptacle 100 includes the chamber 121. Mounted within the chamber 121 is the alignment sleeve 130. The alignment sleeve 130 is split at joint 135 adjacent the boss 126 of the receptacle housing 120. The alignment sleeve 130 has mounted thereon the spring clip 150 which includes the arm 152 having the hook portion 154. The hook portion 154 protrudes through the window 190 of the alignment sleeve 130. Mounted within the hook portion 154 of the spring clip 150 are the alignment members 140,141. Supported and aligned by the alignment members 140,141 is the ferrule 30. The alignment means provides a spring force of approximately one to three pounds against the beveled edges 35 parallel to the major surfaces 41,42 of the ferrule halves 31,32. Upon insertion of the ferrule 30 within the receptacle 100, the alignment members 140,141 abut the beveled edges 35 of the ferrule 30 and cause the sleeve 130 to expand causing the joint 135 to separate and move away from the boss 126 of the housing 120. When the ferrule is removed, the joint 135 contracts and abuts the boss 126 and the boss maintains the alignment assembly 130 in a pretensioned state in order to provide for a low insertion force receptacle. In a preferred embodiment, the boss 126 is integrally molded with the housing 120 and protrudes transversely within the chamber 121. The ferrule 30 includes first ferrule half 31 and second half 32. First major surface 41 of first ferrule half 31 abuts second major surface 42 of the second ferrule half 32. Each half 31,32 of the ferrule includes grooves, such as V-grooves 36 and mounted within the V-grooves 36 are optical fibers 50. Such a ferrule 30 may then be aligned according to the miniaturized MP optical interconnect system of the present invention so that the fibers mounted in the mated ferrules 30,30' are rectilinear with the alignment members 140,141 of the alignment sleeve.

FIG. 10 discloses a side view of the alignment means of the present invention as shown in FIG. 6. The alignment sleeve 130 includes spring clip 150 having arms 152, including hook portion 153 which supports alignment member 140. The hook portion 153 protrudes through window 190 of the alignment sleeve 130. The alignment sleeve assembly 130 includes spring clips 150a and 150b and integral hook arms 153 for retaining the alignment members 140. The hook arms 153 form resilient members to hold the alignment members 140 in an abutting position to the sleeve section. The hook arms 153 also hold the two alignment members 140 and the split alignment sleeve in relative position.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A massive parallel optical interconnect system comprising:
 a plug connector body including an aperture therethrough including a generally rectangular ferrule having beveled edges; and
 a receptacle including an opening having an alignment sleeve mounted within the opening having a pair of alignment members for providing alignment with the beveled edges of the ferrule.

2. The interconnect system of claim 1 wherein the ferrule accommodates multiple fibers.

3. The interconnect system of claim 1 wherein the ferrule is a molded plastic ferrule having grooves therein for receiving optical fibers.

4. The interconnect system of claim 3 wherein the grooves are rectilinear to the beveled edges of the ferrule.

5. The interconnect system of claim 1 wherein the plug body includes a mating end that dimensionally conforms to an SC style fiber optic connector form factor having an end face dimension of approximately 8.99 mm×7.39 mm.

6. The interconnect system of claim 1 wherein the ferrule includes at least two optical fibers.

7. The interconnect system of claim 1 comprising a pair of plug bodies inserted into either end of the receptacle and providing for a precision alignment of the ferrules.

8. The interconnect system of claim 1 wherein the alignment sleeve includes a pair of alignment members mounted within the receptacle, providing a spring-form system applying a force through the alignment members and to the beveled edges of a ferrule parallel to major surfaces of the ferrule halves.

9. The interconnect system of claim 1 wherein the alignment sleeve is split and the receptacle includes a pretensioning means.

10. The interconnect system of claim 1 wherein the alignment sleeve includes a means for retaining alignment members within the alignment sleeve.

11. The interconnect system of claim 10 wherein the retaining means includes a spring clip having arms having a hook portion for engaging the alignment member.

12. The interconnect system of claim 10 wherein the spring clip applies a spring force through the alignment members to the beveled edges of the ferrule parallel to major surfaces of the ferrule halves.

13. The interconnect system of claim 1 wherein the receptacle includes a boss for pretensioning the alignment sleeve.

14. The interconnect system of claim 1 wherein the plug body includes a rear holder mounted at the cable entry end of the plug body; the rear holder including a longitudinal slot for receiving a fiber optic cable.

15. The interconnect system of claim 14 wherein the rear holder includes a strain relief portion for receiving a bend relief boot.

16. The interconnect system of claim 14 wherein the fiber optic cable is secured to the rear holder via a retention means to capture strength members of the fiber optic cable and transfer forces applied to the cable to the plug body.

17. The interconnect system of claim 1 wherein the plug body includes a marking to designate the position of the first optical fiber.

18. The interconnect system of claim 1 wherein the plug body includes a resilient member to provide for the axial resiliency of the ferrule.

19. The interconnect system of claim 1 wherein the aperture of the plug body includes a diameter greater than the diameter of the ferrule wherein the ferrule is pivotally movable within the plug body.

20. The interconnect system of claim 1 wherein the plug body includes a sliding tab release sleeve.

21. The interconnect system of claim 1 wherein the receptacle includes latch arms.

22. The interconnect system of claim 1 wherein the receptacle includes an opening which dimensionally conforms to an SC style fiber optic receptacle form factor including an opening of approximately 9.0 mm×7.4 mm.

23. The interconnect system of claim 1 wherein the ferrule includes a window for receiving adhesive therethrough.

24. The interconnect system of claim 1 wherein the ferrule is terminated by inserting multiple optical fibers within grooves of the ferrule; securing the optical fibers within the grooves via chemical bonding and polishing the end face of the ferrule.

25. The interconnect system of claim 1 wherein the ferrule is formed of two halves each having a major surface having V-grooves therein and the halves each having a pair of beveled edges.

26. The interconnect system of claim 25 wherein the ferrule halves include a mating end and a rear end having a collar half molded integrally with the ferrule half.

27. The interconnect system of claim 25 wherein the ferrule includes a mating end and a rear end having a collar mounted thereon.

28. The interconnect system of claim 25 wherein the ferrule halves are bonded together and the fibers are secured therein via an adhesive.

29. A massive parallel optical connector comprising:
a plug connector body having an aperture therethrough; and
a molded plastic ferrule surrounding multiple optical fibers and having an end face on a same plane as end faces of the optical fibers and the ferrule mounted in the aperture and the ferrule having beveled edges.

30. The connector of claim 29 wherein the ferrule is a molded plastic ferrule having grooves therein for receiving the optical fibers.

31. The connector system of claim 30 wherein the grooves are rectilinear to the beveled edges of the ferrule.

32. The connector of claim 29 wherein the plug body includes a mating end which dimensionally conforms to an SC style fiber optic connector form factor having an end face dimension of approximately 8.99 mm×7.39 mm.

33. The connector of claim 29 wherein the ferrule includes twelve optical fibers.

34. The connector of claim 29 wherein the plug body includes a rear holder mounted at the cable entry end of the plug body; the rear holder including an aperture for receiving a fiber optic cable.

35. The connector of claim 34 wherein the rear holder includes a strain relief for receiving a bend relief boot.

36. The connector of claim 34 wherein the fiber optic cable is secured to the rear holder via a retention means to capture strength members of the fiber optic cable and transfer forces applied to the cable to the plug body.

37. The connector of claim 29 wherein the plug body includes a marking to designate the position of the first optical fiber.

38. The connector of claim 29 wherein the plug body includes a .resilient member to provide for the axial resiliency of the ferrule.

39. The connector of claim 29 wherein the aperture of the plug body includes a diameter greater thin the diameter of the ferrule so that the ferrule is pivotally movable within the plug body.

40. The connector of claim 29 wherein the plug body includes a sliding tab release sleeve.

41. The connector of claim 29 wherein the ferrule includes a window for receiving adhesive therethrough.

42. The connector of claim 29 wherein the ferrule is terminated by inserting multiple optical fibers within grooves of the ferrule; securing the optical fibers within the grooves via chemical bonding and polishing the end face of the ferrule.

43. The connector of claim 29 wherein the ferrule is formed of two halves each having a major surface having V-grooves therein and the halves each having a pair of beveled edges.

44. The connector of claim 43 wherein the ferrule halves include a mating end and a rear end having a collar half molded integrally with the ferrule half.

45. The connector of claim 43 wherein the ferrule includes a mating end and a rear end having a collar mounted thereon.

46. The connector of claim 43 wherein the ferrule halves are bonded together and the fibers are secured therein via an adhesive.

47. A massive parallel optical connector comprising:
a plug body including a mating end which dimensionally conforms to an SC style fiber optic connector form factor profile having an end face dimension of 8.99 mm×7.39 mm and an aperture through the plug body; and
a ferrule having multiple fibers and the ferrule mounted within the aperture.

48. The connector of claim 47 wherein the ferrule includes beveled edges.

49. The connector of claim 47 wherein the ferrule is formed of two halves each having a major surface having V-grooves therein and the halves each having a pair of beveled edges.

50. The connector of claim 49 wherein the ferrule is a molded plastic ferrule with V-grooves.

51. The connector of claim 50 wherein the V-grooves are rectilinear to the beveled edges.

52. A massive parallel optical connector comprising:
a first block of polymer material having a groove formed in a first major surface for receiving multiple, parallel, optical fibers and a collar half molded integrally at a rear end of the first block;

a second block having a second major surface abutting against the first major surface of the first block; and a connector housing having an end face and an aperture for receiving the first and second blocks wherein a portion of the first and second blocks form an end face extending beyond the end face of the housing and the end face of the blocks on a same plane as end faces of the optical fibers.

53. The connector of claim 52 wherein the second block is formed of a polymer material.

54. The connector of claim 52 wherein the second block includes a groove formed in the second major surface.

55. The connector of claim 52 wherein the first and second blocks form a ferrule having multiple fibers.

56. The connector of claim 52 wherein the first block includes beveled edges being rectilinear to the grooves.

57. The connector of claim 52 wherein the housing end face dimensionally conforms to an SC style fiber optic connector form factor having an end face diameter of approximately 8.99 mm×7.39 mm.

58. The connector of claim 52 wherein the housing includes a rear holder mounted at a cable entry end of the housing; the rear holder including an aperture for receiving a fiber optic cable.

59. The connector of claim 52 wherein the first and second blocks include a mating end and a rear end having a collar mounted thereon.

* * * * *